(12) United States Patent
Junnarkar et al.

(10) Patent No.: US 6,898,347 B2
(45) Date of Patent: May 24, 2005

(54) MONITORING POWER IN OPTICAL NETWORKS

(75) Inventors: Mahesh R. Junnarkar, San Jose, CA (US); Anirban Bandyopadhyay, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 10/448,759

(22) Filed: May 30, 2003

(65) Prior Publication Data

US 2004/0240783 A1 Dec. 2, 2004

(51) Int. Cl.[7] ................................................. G02B 6/26
(52) U.S. Cl. ............................. 385/31; 385/33; 385/39; 385/74; 385/88; 385/93
(58) Field of Search ............................. 385/31–33, 39, 385/74, 79, 88, 89, 93, 147

(56) References Cited

U.S. PATENT DOCUMENTS

| | | | | | |
|---|---|---|---|---|---|
| 5,195,150 | A | * | 3/1993 | Stegmueller et al. | 385/33 |
| 5,335,243 | A | * | 8/1994 | Kubena et al. | 372/99 |
| 5,987,202 | A | * | 11/1999 | Gruenwald et al. | 385/49 |
| 2003/0161603 | A1 | * | 8/2003 | Nadeau et al. | 385/137 |

* cited by examiner

*Primary Examiner*—Drew A. Dunn
*Assistant Examiner*—Fayez Assaf
(74) *Attorney, Agent, or Firm*—Trop, Pruner & Hu, P.C.

(57) ABSTRACT

An optical network may include a detector for detecting the power of each of a plurality of channels of a wavelength division multiplexed optical signal in one embodiment of the present invention. Each channel may be conveyed to an interface underneath a detector by way of a core formed in the substrate. The interface may include a trench with one side surface angled to form a reflector to reflect light upwardly to be detected by the detector. The trench may be filled with a convex microlens.

20 Claims, 2 Drawing Sheets

MONITORING POWER IN OPTICAL NETWORKS

BACKGROUND

This invention relates generally to optical networks.

A planar light circuit is an optical circuit that uses integrated waveguides. These waveguides may be integrated into a substrate that, in some embodiments, may be an integrated circuit substrate. The planar light circuit may be formed using techniques that are known in forming integrated circuits.

Commonly it is desired to monitor the power in each channel in a planar light circuit. For example, in wavelength division multiplexed (WDM) networks, a large number of channels, each with a different wavelength, may be multiplexed together. It is important to know the power of each channel since each channel may be ultimately separated, at its intended destination, from the multiplexed signal.

WDM utilizes a system comprising a plurality of parallel transmitter-receiver pairs. Each of the information sources modulates one of the optical transmitters, each of which produces light at a different wavelength. The modulation bandwidth of each source is narrower than the separation between the wavelengths, resulting in a spectra of the modulated signals which do not overlap. The signals produced by the transmitters are combined into one optical fiber in a WDM multiplexer, which is an optical, and often passive component. At an opposite end of the optical fiber, a WDM demultiplexer, also an optical and often passive component separates the different spectral components of the combined signal from each other. Each of these separated signals is detected by a different receiver. Thus, each signal is assigned a narrow wavelength window in a specific wavelength range.

An arrayed waveguide grating (AWG) is a component used in fiber optics systems employing WDM. The various elements of an AWG are normally integrated onto a single substrate. An AWG comprises a plurality of optical input/output waveguides on both sides of the substrate, two slab waveguides, and a grating that consists of channel waveguides that connect the slab waveguides together, which in turn, connect the input/output guides to the separate channel waveguides. The slab waveguides restrict the propagation of light to the plane perpendicular to the substrate but allow light propagation to both sides of the component. The channel waveguides, on the other hand, prevent light propagation to the sides. The channel waveguides are arranged on a circular arc so that each of them is directed towards a center waveguide of the channel waveguide group or grating on an opposite side of the component.

A constant optical path difference exists between two adjacent channel waveguides in the grating. This path difference is a multiple of the center wavelength used. If light is input from the center input/output waveguide of one side at the center wavelength of the component, the light is distributed to all the waveguides of the grating. As the difference in length of the waveguides is a multiple of the center wavelength, all the waves are in the same phase upon arriving in the output slab waveguide whereupon the light is focused to the center output waveguide. Hence, an AWG focuses different wavelengths to different outputs and the dimensioning of the component determines which wavelengths are focused on which output. Thus, an AWG thus comprises a number of light channels with both focusing characteristics (i.e., a lens) and dispersing characteristics (i.e., the wavelength dependency of the grating).

In an optical communications system, it is often required to adjust the intensity or optical power of the light signals being transmitted. For example, the quality of a signal is determined by the ratio between the intensity of an optical signal and the intensity of noise in the optical signal. This ratio is commonly referred to as the optical signal-to-noise ratio (optical SNR). Therefore, it is often necessary to adjust the intensity of a light signal to increase the optical SNR above a predetermined level.

Moreover, to increase the optical SNR of a wavelength division multiplexed (WDM) signal in an optical communication system, the individual light signals normally must have the same light intensity. However, the intensity of each light signal undesirably varies according to a variation in the output power of the light source generating the light signal and according to variations in the insertion loss of optical components in the optical communication system. Also, an optical amplifier typically has a wavelength dependent gain, which thereby causes the various light signals to have different intensities.

To alleviate this problem, variable optical attenuators (VOA) are typically used to control the intensity of each light signal, and thereby maintain each light signal at the same intensity. Generally, a VOA attenuates, or reduces, the intensity of some of the light signals so that all of the light signals are maintained at the same intensity.

An evanescent coupler is formed with two waveguides disposed together in a substrate and that extend for a coupling distance close to each other, such that the light wave modes passing along each waveguide overlap. The overlap causes some light from one waveguide to pass to the other, and vice versa. The two waveguides in the evanescent coupler separate away from each other outside of the coupling distance.

In the architectures of many photonics devices, such as AWGs, VOAs, optical power monitors, and evanescent couplers, it is desirable to perform optical detection at an upper surface of the planar light circuit (PLC). Accordingly, better ways to detect optical power are needed.

DETAILED DESCRIPTION

Figure 1:
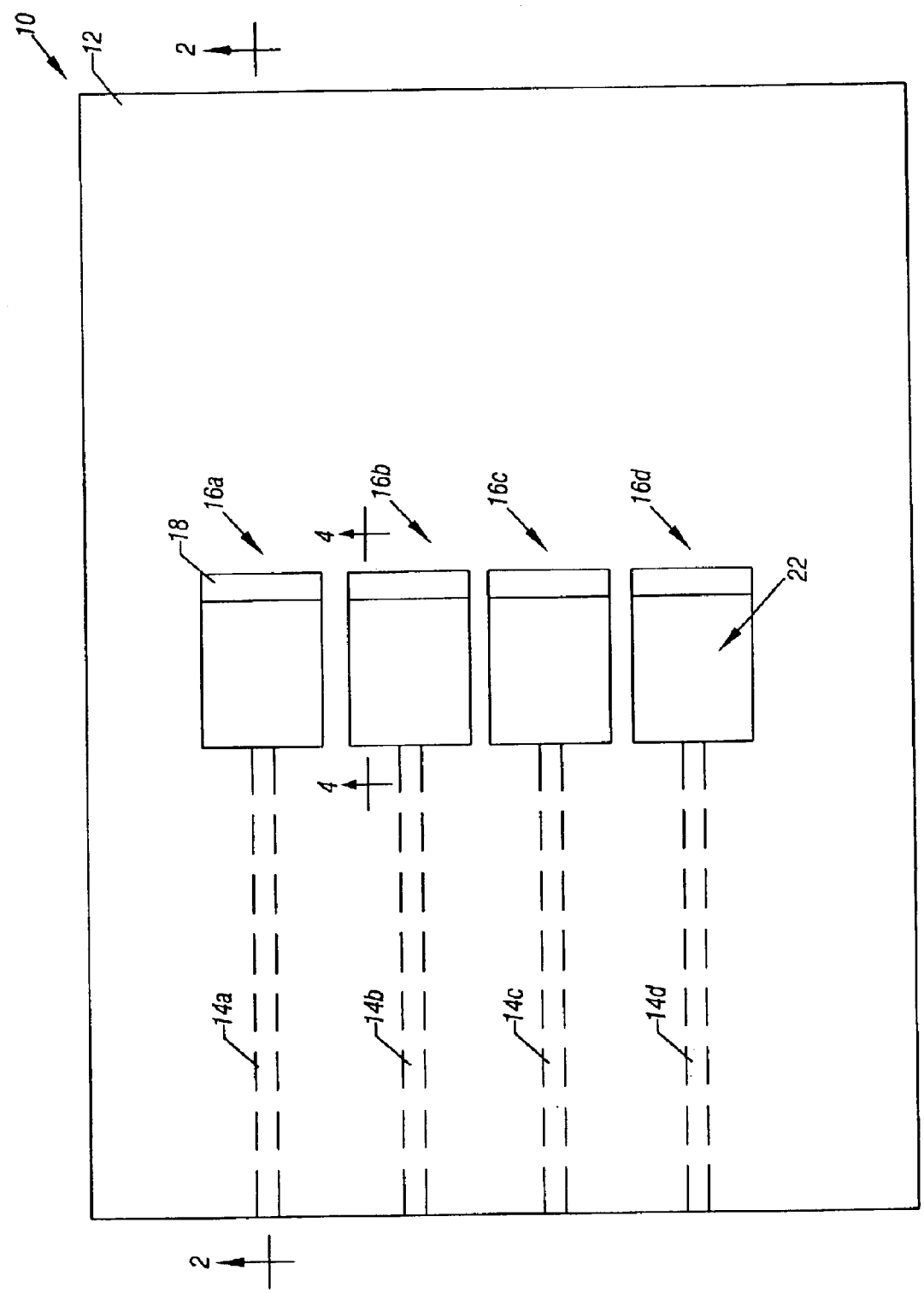
FIG. 1 is a top plan view of one embodiment of the present invention without the power detector array.

Referring to FIG. 1, a planar light circuit 10 may include a substrate 12 which, in one embodiment, may be formed of silicon, but other substrate materials may be used as well. A plurality of cores 14a through 14d may extend inwardly from one edge of the substrate 12. Each core 14 may carry a signal associated with one channel of a wavelength division multiplexed signal. Each core 14 may be coupled to an interface 16 that interfaces the cores 14 with a power monitor array not shown in FIG. 1.

Each interface 16 may include a trench 22 including an angled reflector 18. The reflector 18 deflects incident light from a core 14 upwardly to be detected by an overlying power detector.

Figure 2:
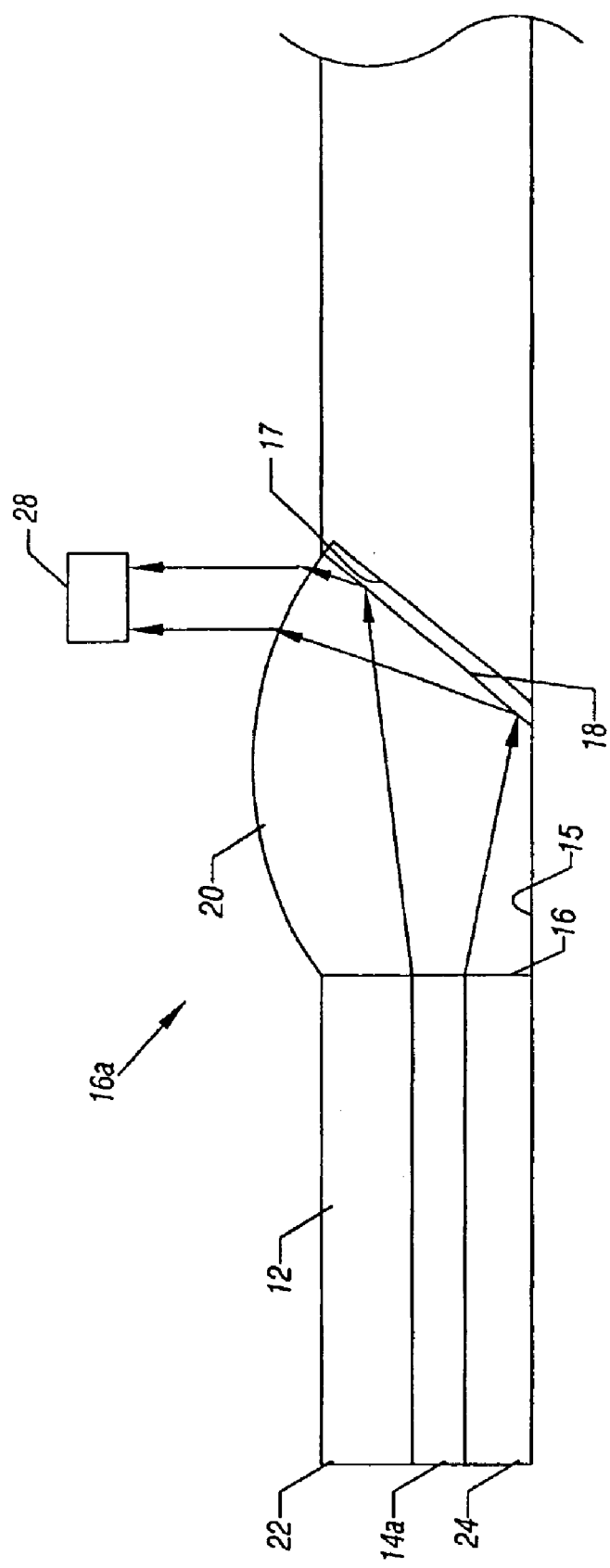
FIG. 2 is an enlarged cross-sectional view taken generally along the line 2—2 in FIG. 1.

Referring to FIG. 2, a lower cladding 24 is deposited on the substrate 12 before a core 14a is deposited on the lower cladding 24 and an upper cladding layer 22 is deposited on the core 14a. The trench 22 is etched through the upper cladding 22, core 14, and lower cladding 24.

The trench 22 includes a proximal wall 16 and a distal wall 17. The walls 16, 17 may be non-vertical with respect to the substrate 12. A wet etch process may be used to form non-vertical walls while a dry etch process may be used to form vertical walls. Further, appropriately sloping wall 17 can be formed by combining a dry etch process followed by a reflowing the upper cladding 14 to convert vertical walls to angled or sloped walls. In the embodiment shown in FIG. 2, the wall 17 is formed at approximately 45° with respect to the substrate 12 by way of a wet etch process. However, other non-vertical configurations can be used as well.

After formation of the trench 22, reflective mirror 18 is deposited on the distal wall 17. Useful reflective materials include epoxies with high refractive indexes, eutectic alloy materials, metal solders, reflow boro-phospho-silicate-glass (BPSG) and others.

The substrate 12 may define the core 14 and an upper cladding 24 as well as a lower cladding 26. The core 14 ends at the trench 22. Thus, light incident on the substrate 12 passes through the core 14 to be reflected from the reflector 18 to travel upwardly to be detected by the detector 28.

After the formation of the trench 22, a polymer material, in the form of a droplet, may be deposited in the trench 22 to form a convex microlens 20 in accordance with one embodiment of the present invention. The polymer used to form the lens 20 may be one which has a refractive index above about 1.5, for example, approximately 1.8, and one which, in some embodiments, may be suitable to passivate the material used to form the reflector 18. In some embodiments, the lens 20 may be of a material which may be dispensed from an inkjet-type dispenser and then solidified using chemical or ultraviolet curing, as two examples.

As a result, the lens 20 has a semi-hemispherical or convex upper surface due to surface tension. Lens 20 then enables collimation or long focal length, converging the reflected light from the mirror 18 to the photodetector 28 with improved efficiency. The size of the trench 22 and the viscosity of the liquid polymer utilized to form lens 20, along with its surface tension, determine the curvature of the lens 20 surface. In some embodiments, due to the collimation effect, a smaller photodetector 28 may be utilized, providing additional active area for other purposes.

While an embodiment is illustrated in which a droplet is deposited to form the lens 20, other techniques for forming microlenses in connection with displays may be utilized as well. The present invention is applicable to a variety of optical devices including variable optical attenuators, erbium-doped waveguide amplifiers, optical add/drop multiplexers, arrayed waveguides, and evanescent couplers, to mention a few examples, that may need power monitoring.

Suitable polymers to form the lens 20 include the following: 4-N-hydroxy-ethlamino-4-nitroazobene (HANA), 4-Hydroxy-2'-methyl-4-nitroazobenzene (HMNA), and perfluoroalkyl methacrylate (PFMA)

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

forming an optical core within a substrate;

forming a trench having a first and second wall in said substrate optically coupled to said core;

forming an angled reflector on said first wall to reflect light from said core; and forming a convex microlens in said trench.

2. The method of claim 1 including providing a power detector on the surface of said substrate to receive the light reflected out of said substrate by said reflector.

3. The method of claim 1 including forming a planar light circuit including said trench.

4. The method of claim 1 including forming said convex microlens using an inkjet printer mechanism.

5. The method of claim 1 wherein forming a convex microlens includes depositing a droplet in said trench.

6. The method of claim 5 including depositing a droplet of a polymer.

7. The method of claim 6 including curing said droplet.

8. The method of claim 6 including forming a droplet having a convex upper surface.

9. An optical device comprising:

a substrate;

an optical core in said substrate;

a trench in said substrate optically coupled to said core, said trench including a reflector;

a power detector over said trench to receive light from said core reflected by said reflector; and a convex microlens formed in said trench.

10. The device of claim 9 wherein said substrate forms a planar light circuit.

11. The device of claim 9 wherein said convex microlens is a polymer droplet formed in said trench.

12. The device of claim 9 wherein said convex microlens includes a convex upper surface extending over said trench.

13. The device of claim 9 wherein the refractive index of said microlens is above 1.5.

14. An optical device comprising:

a substrate;

a cavity in said substrate optically coupled to said core, said cavity including at least two opposed sidewalls and an angled reflector;

a power detector over said cavity to receive light from said core reflected out of said substrate by said reflector; and a microlens formed in said cavity.

15. The device of claim 14 wherein said cavity includes a wall opposite said reflector, said core coupled to said cavity through said opposite wall.

16. The device of claim 14 wherein said substrate forms a planar light circuit.

17. The device of claim 14 wherein said microlens is formed of a polymer.

18. The device of claim 14 wherein said microlens has a convex upper surface.

19. The device of claim 14 wherein said microlens is formed of a polymer droplet.

20. The device of claim 14 wherein the refractive index of said microlens is above 1.5.

* * * * *